Patented July 23, 1940

2,208,942

UNITED STATES PATENT OFFICE 2,208,942

PROCESS FOR THE PRODUCTION AND PURIFICATION OF SEXUAL HORMONE DERIVATIVES

Emil Kaiser, Budapest, Hungary, assignor to Chemical Works of Gedeon Richter Ltd., Budapest, Hungary No Drawing. Application February 27, 1937, Serial No. 128,157. In Hungary May 5, 1936

6 Claims. (Cl. 260—397)

This invention relates to a process for the production and purification of sexual hormone derivatives.

It is known that hydrogenated derivatives have a greater effect than the pure hormone itself. This applies both to the follicle hormone and to the male sexual hormone. In the case of the former, the production of the dihydro follicle hormone is aimed at, and for this purpose, as well as for the production of a hydro-derivative of the male sexual hormone, various complicated, difficult and expensive methods have been proposed, in which the hydrogenation is effected by means of an alkali metal, or with free hydrogen in the presence of catalysts and the like. A common feature of all these processes is that by the use thereof no purification of the crude hormone is brought about, and pure substances must be employed as initial materials or a subsequent purification must be carried out.

It has been found, according to this invention, that if the hormones, or raw materials containing them, such as crude hormone oil, be treated with a solution of a hydrosulphite, for example sodium hydrosulphite, in addition to a considerable purification (decolouration) of the product a much more effective hormone derivative is obtained.

Accordingly, the process of this invention for the production and purification of follicle hormone derivatives or of male sexual hormone derivatives is characterised in that the hormones or substances containing them are subjected to the action of hydrosulphites, preferably sodium hydrosulphite.

The following examples illustrate how the process of the invention may be carried into effect.

1. A crude follicle hormone oil of 1 million mouse units is dissolved in aqueous sodium hydroxide, whereupon 5 grammes of sodium hydrosulphite are added to the dark-brown solution, and the mixture is boiled for one to two hours and allowed to stand for twelve hours. The solution is then filtered off from the separated sulphur, the precipitate is washed with soda lye and then removed by agitation with an organic solvent, for example with benzene. The strongly oestrogenous product is separated from the light-brown to light-yellow solution, if necessary with the aid of further known purifying methods.

2. 0.5 gram of the follicle hormone having a melting point of 252° C. are dissolved in 50 cm.$^3$ of alcohol, 20 cm.$^3$ of 20% aqueous sodium hydroxide and 150 cm.$^3$ of 4% aqueous sodium hydrosulphite solution are added, and the mixture is boiled for one hour under a reflux condenser, is then allowed to stand for twelve hours and then shaken out with an organic solvent, for example with ethyl ether. The latter is distilled off, the residue is mixed with alcohol and the product is removed from the alcoholic solution with water. The sodium hydrosulphite used in the process is a reducing agent and the ketonic groups of hormone compounds present in the hormone oil used as the starting material, are reduced to hydroxyl groups. The dried white powder having a melting point of 166° C. has an increased oestrogenous effect and has been identified as oestradiol. The reduction and/or purification is repeated if required.

3. A dark-coloured crude hormone oil obtained from 100 litres of male urine is dissolved in aqueous sodium hydroxide and boiled for 1 to 2 hours after the addition of 20 grams of sodium hydrosulphite. From the solution, which has become light in colour, the hormone derivative or the preparation containing it is produced in known manner.

4. 0.05 gram of crystalline male sexual hormone is dissolved in alcohol, 30 cm.$^3$ of a 20% aqueous sodium hydroxide are added, which contains 2 grams of sodium hydrosulphite, the whole is boiled for two hours, left to stand until the next day and the hormone derivative is shaken out with an organic solvent, for example with ethyl ether.

I claim:

1. The herein described process of producing and purifying hydrogenated sex hormone derivatives, which process comprises the step of subjecting a compound selected from the group consisting of the follicle hormone and the male sex hormone to the action of hydrosulfite in water.

2. The herein described process of producing and purifying hydrogenated sex hormone derivatives, which process comprises the step of adding hydrosulfite to an aqueous alkaline solution of a compound selected from the group consisting of a follicle hormone and the male sex hormone, boiling the solution, filtering the solution, and shaking the hydrogenated hormone derivative out of the solution with an organic solvent.

3. The herein described process of producing purified hydrogenated sex hormone derivatives, which process comprises the steps of adding a solution of hydrosulfite in water to an alcoholic aqueous alkaline solution of a compound selected from the group consisting of the follicle hormone and the male sex hormone, boiling the mixture, shaking the mixture out with an organic solvent, evaporating the solvent, dissolving the residue in alcohol, and separating the hydrogenated purified hormone derivative from the alcohol solution with water.

4. A process for producing and purifying a hydro-derivative of the male sex hormone, which process comprises the steps of dissolving a crude oil containing male sex hormone in aqueous sodium hydroxide, adding sodium hydrosulfite to the solution and boiling the mixture.

5. A process for producing and purifying a hydro-derivative of the male sex hormone, which process comprises the steps of adding to an alcoholic solution of the male sex hormone an aqueous solution of sodium hydroxide and sodium hydrosulfite, boiling the mixture, allowing it to stand for about 12 to 24 hours, and shaking out the hormone derivative with an organic solvent.

6. A process, as claimed in claim 1, wherein a solution of sodium hydrosulfite is employed.

EMIL KAISER.